United States Patent Office 3,499,317
Patented Mar. 10, 1970

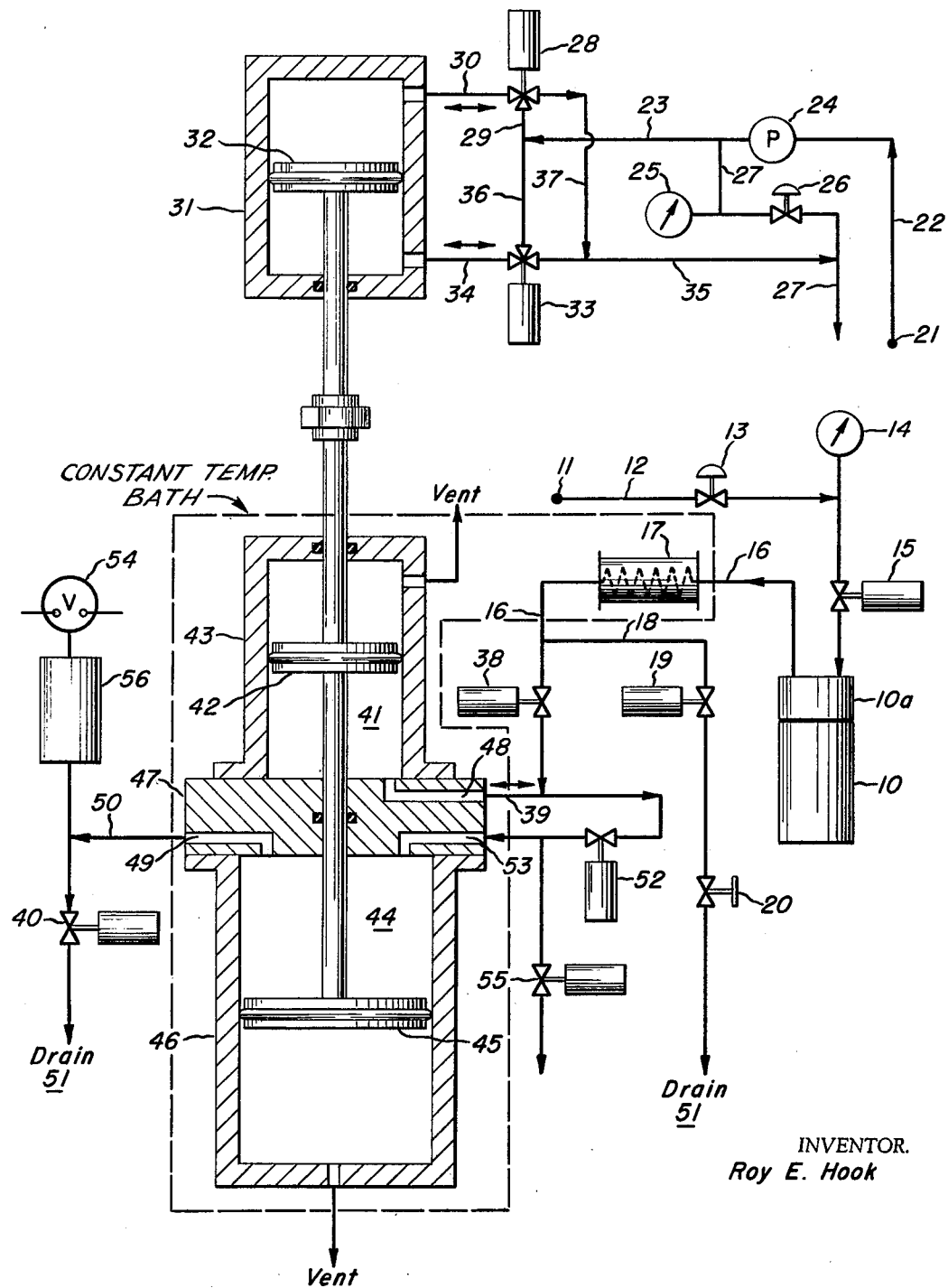

3,499,317
APPARATUS FOR MEASURING VAPOR PRESSURE
Roy E. Hook, Griffith, Ind., assignor to Standard Oil
Company, Chicago, Ill.
Filed Sept. 27, 1967, Ser. No. 670,876
Int. Cl. G01n *11/00*
U.S. Cl. 73—64.2
8 Claims

ABSTRACT OF THE DISCLOSURE

Instrument for the direct determination of the vapor pressure of a mixture of liquids having different boiling points is described. Basically, the instrument has a liquid measuring first chamber, a liquid vaporizing second chamber, an interruptable fluid flow communication connecting the chamber for flow only from the first chamber to the second chamber, a reference temperature maintaining receptacle for the connected chambers, and a vapor pressure measuring means connected to the vapor space of the second chamber. A more complex form of the instrument operates automatically from flushing through measurement of vapor pressure and is adaptable for the automatic monitoring of process streams. One or more pre-operations of the instrument with new liquid sample flushes the remains (liquid and vapor) of previously tested samples from the instrument and eliminates the need for use of contaminating and/or interfering wash materials.

BACKGROUND OF THE INVENTION

The present invention relates to an apparatus for determining the vapor pressure of a fluid. The apparatus is especially useful for the direct determination of Reid Vapor Pressure (hereinafter referred to as R.V.P.) of volatile crude oil and volatile non-viscous petroleum products excluding liquified petroleum gases. More particularly, it relates to an apparatus for directly determining R.V.P. of normally liquid mixtures of hydrocarbons having different boiling points without the need for correcting the pressure readings for the effect of air and water vapor partial pressures. This is possible because the instrument is pre-calibrated as will be later described. Still more particularly, this invention relates to an instrument for rapidly and automatically determining the R.V.P. of volatile normally liquid hydrocarbon fuels and for obtaining a direct reading of the R.V.P. so determined.

One of the critical product specifications which must be met in the manufacture of gasolines, diesel fuels, and jet fuels, is that of vapor pressure. Vapor pressure is the pressure exerted when a solid or liquid is in equilibrium with its own vapor. When dealing with a pure substance, the amount of liquid and vapor present does not affect the equilibrium vapor pressure provided some liquid is present. The main factors determining the vapor pressure are the nature of the substance and its temperature.

Vapor pressure is a measure of the tendency of a substance to vaporize. Thus, vapor pressure plays a major role in determining for fuel its volatility, vapor locking tendency, engine performance, and potential evaporation loss. Gasolines, diesel fuels, and jet fuels are mixtures of hydrocarbons having different boiling points. The total vapor pressure of such mixtures in a container depends on such factors as the ratio of vapor space to liquid volume, temperature, composition, and amount of dissolved air. Because of the importance of vapor pressure, the petroleum industry has set certain vapor pressure test specifications for fuel products. The most commonly used method for determining the vapor pressure of normally liquid hydrocarbon fuels is the standard test (Reid Method) defined by ASTM Designation D–323–58. One of the advantages of the Reid Method is the elimination of discrepancies caused by varying amounts of dissolved air in the test sample resulting from the use of different refining techniques and storage conditions.

Briefly, ASTM D–323–58 R.V.P. method requires that the fuel sample be chilled to a temperature between 32° and 40° F. Fuel samples believed to have a R.V.P. below 26 pounds are required by the ASTM method to be saturated with air at the chilled conditions. The apparatus for performing the ASTM R.V.P. test includes a "gasoline" chamber and an "air" chamber. ASTM D–323–58 specifies that the volume ratio of the air chamber to the gasoline chamber must be between the limits of 3.8 and 4.2 to 1. After performing the prescribed conditioning steps to the test apparatus, the gasoline chamber is filled with fuel sample. The air chamber preheated to 100° F. is attached to the gasoline chamber so that there is an open path between the two chambers for fuel sample liquid and vapors. The combined chambers are immersed in a constant temperature bath at 100±0.2° F. and periodically shaken until thermal equilibrium is achieved. The total pressure of the vapor and air above the remaining liquid sample is measured and recorded as the R.V.P.

The Reid Method as specified in ASTM D–323–58, though extremely useful, involves a tedious and time-consuming manual operation. Because of the need for obtaining accurate, precise, and reproducible results, the careful attention of one skilled in performing the test is required for about one-half hour or more per R.V.P. determination. It is highly desirous to minimize the time required to obtain a R.V.P. determination and still retain the accuracy, precision, and reproducibility of the original test method. R.V.P. data is needed for product control in the blending of fuel components. Because the operating conditions of refinery process equipment frequently change, the properties of blending stocks change. In order to meet the vapor pressure specification of the final fuel blend, the person conducting the blending operation must, at all times, know the vapor pressure of each component. He must also be able to rapidly check the vapor pressure of the final blend. Delays in obtaining this data can seriously increase the difficulty of meeting product vapor pressure specification.

The instrument of this invention has been found to give rapid and precise determination of vapor pressures that correlate well with the R.V.P. data obtained by one skilled in conducting the ASTM D–323–58 test. Use of the instrument of this invention requires less than one minute of operator time and provides the required vapor pressure data in about four minutes from the time that the instrument is started. Although it measures vapor pressure, the instrument is calibrated to directly indicate R.V.P. By compter analysis of a large number of hydrocarbon samples, I have found that a nearly linear relationship exists between the absolute vapor pressure measured by the instrument and R.V.P. measured by the ASTM D–323–58 method. This is especially true in the ordinary gasoline R.V.P. range of 5 to 16 p.s.i. Full range calibration of the instrument can be obtained by adjustment of the instrument at the R.V.P. values of 5 p.s.i. and 16 p.s.i. Because that relationship is not quite linear, the instrument is not used for providing direct R.V.P. data outside of the calibration range. However, it is sometimes desirable to measure the R.V.P. of samples having a pressure slightly above or below the calibration range e.g. 2 to 5 p.s.i. or 16 to 20 p.s.i. Although the instrument will not give a direct reading of R.V.P. in these ranges, correction factors are applied to the indicated instrument reading to arrive at the R.V.P. The correction factors can be derived either from the above-mentioned computer correlation or from separate determinations of R.V.P. of standard samples using both the instrument and the ASTM D–323–58 method.

The instrument of this invention, once initially calibrated, has been found to give R.V.P. data agreeing with the Reid Method within ASTM specifications ($\pm 0.3$ p.s.i. maximum difference, 95% of confidence level) for alcohol free samples. The repeatability of sequential replicates run on the instrument agree to within less than 0.05 p.s.i.

Hydrocarbon mixtures containing small amounts of alcohol (isopropanol, methanol, and etc.) often exhibit abnormally high R.V.P. because a minimum boiling azeotrope tends to form. This pressure effect is influenced by the presence or absence of water in the hydrocarbon sample. Thus, if water is introduced into the sample prior to or during the R.V.P. test, the R.V.P. of the original sample cannot be measured. The water in the sample acts as a solvent for the alcohol present thereby making the alcohol unavailable for azeotropic formation. The ASTM D–323–58 test method requires the test apparatus to be cleaned between tests by a certain procedure requiring a water bath. The ASTM method does not require drying the cleaned apparatus. Water remaining in the test equipment introduces intrinsic error potential into the R.V.P. determination when using the ASTM D–323–58 method on gasoline samples containing alcohol. Water present in the ASTM D–323–58 test equipment tends to vary randomly and thus has an indeterminate effect on the alcohol vapor pressure. Use of the apparatus disclosed herein avoids this potential error because water is not required to clean the instrument. The instrument of this invention can even be used to determine the alcohol pressure effect in a gasoline sample. This determination is performed by running two tests on duplicate samples, one of the samples having had the alcohol removed. Alcohol may be effectively removed from gasoline by the addition of water and the shaking of the mixture to assure intimate contacting between water and alcohol. The water is added prior to the air saturation of the sample. I have found that three to five volume percent water is sufficient, for example, to remove up to 0.15 volume percent methanol.

SUMMARY OF THE INVENTION

This invention provides an improved apparatus for determining vapor pressure of volatile crude oil and nonviscous petroleum products other than liquefied petroleum gas. More specifically, using the improved apparatus, direct measurement of the R.V.P. of a liquid hydrocarbon mixture such as gasoline can be made.

This invention uses the evacuated chamber principle for determining the vapor pressure of a liquid. The method includes the steps of air saturating a sample of the liquid at a temperature between 32 and 40° F., heating an initial measured volume of the liquid to a first reference temperature, expanding the measured volume of liquid into an initially evacuated zone having a volume substantially greater than the initial measured volume of the liquid, bringing the expanded sample to vapor-liquid equilibrium at a second reference temperature that can but need not be the same as the first reference temperature, and measuring the pressure in the initially evacuated zone. Conveniently, both the first and second reference temperatures are 100° F. It is also convenient to have the volume of the evacuated zone at least four times the volume of the initial measured volume of the liquid sample. Specifically, for R.V.P. determination, the evacuated chamber must have a volume five times that of the measured liquid sample.

The apparatus for determining the vapor pressure comprises a first chamber adapted to receive and discharge the liquid, and a second chamber in fluid communication with the first chamber. The second chamber must have a volume substantially greater than the first chamber. Means for evacuating the second chamber and means for measuring pressure within the second chamber must be provided. Additionally, means for preventing the passage of liquid and vapor (fluids) from the second chamber to the first chamber is required.

Numerous ways of evacuating the second chamber and transferring the sample from the first chamber (hereinafter called the liquid chamber) to the second chamber is commonly provided with a piston to expell the available. One way of evacuating the expansion chamber is to connect it to a vacuum pump through a one-way check valve connection. To transfer the sample from the liquid chamber to the expansion chamber, the liquid chamber is commonly provided with a piston to expel the sample from the liquid chamber but other means of liquid transfer can be used.

A more convenient way to supply both the means for evacuating the expansion chamber and the means for transferring the sample from the liquid chamber to the expansion chamber is to provide each of the chambers with a piston adapted for reciprocating motion within the chambers. Means are provided to completely prevent the leakage of vapor or liquid between the chamber walls and the pistons, for example piston rings or wall mounted seals. Conventional O-rings have been found to perform satisfactorily in this regard. Reciprocating motions of the two pistons are phased in such a manner to provide maximum measured liquid volume in the liquid chamber and complete evacuation of the expansion chamber. Conversely, the phasing also provides transfer of all the liquid from the liquid chamber at the time the expansion chamber piston provides maximum volume in the expansion chamber. Thus, the initial phased piston motion provides an expansion chamber free of all vapor and liquid and the liquid chamber with a measured volume of liquid sample. At the next phased piston motion, the liquid chamber piston expells the liquid sample and the expansion chamber piston draws the sample into the expansion chamber. Since the final volume of the expansion chamber is substantially greater than the initial sample volume, a vacuum tends to form in the expansion chamber causing part of the liquid sample to vaporize. The equilibrium vapor pressure within the expansion chamber is measured at the reference temperature. In order to correspond to the current ASTM specifications for determining R.V.P., the reference temperature must be 100° F. and the final expansion chamber volume must be five times the liquid sample volume.

Many embodiments of the subject instrument may be visualized. For example, the liquid chamber and expansion chamber can have their pistons on individual shafts and have independent phase cooperating control. The pistons, though on separate shafts, can be connected by a lever apparatus providing proper phasing of motion. Another embodiment has the two chambers mounted vertically and the two pistons attached to a single shaft. In any embodiment, the effective operating chamber volumes can be either above or below the piston themselves.

BRIEF DESCRIPTION OF THE DRAWING

The structure and operation of the instrument will be more fully understood by reference to the attached drawing which is a schematic representation of a preferred embodiment showing the liquid chamber and expansion chamber partially in section.

DESCRIPTION OF THE PREFERRED EMBODIMENT

The elements of a preferred embodiment of the apparatus and its function will now be described. A 100–125 milliliter sample is placed in sample cup 10 which is connected to the instrument by attachment to inlet fitting 10a. The liquid sample was pre-treated in accordance with the procedure specified in ASTM D-323-58 regarding chilling and air saturation. Care should be taken to ensure that sample cup 10 is free from water prior to introduction of the sample. Air, at from about 20–50 p.s.i.g. is available to the system from source 11. The two-way solenoid air valve 15 opens to permit air from source 11 to pass via line 12 and pressure regulator 13 into sample cup 10. The pressure of the air passing into sample cup 10 is about 15–18 p.s.i.g. as measured by air gauge 14. It is desirable that the air pressure in sample cup 10 be about 2 p.s.i. greater than the highest R.V.P. anticipated. The two-way solenoid flush valve 19 opens and a portion of the liquid sample contained in sample container 10 is forced by air pressure into lines 16 and 18 through heat exchanger 17 into drain 51. Needle valve 20 in line 18 has been pre-set to limit the liquid flow so that from about 5 to 15 milliliters of liquid sample flows to drain 51 during the time allowed for the flushing operation. When sufficient sample has been passed to the drain, valve 20 is closed to terminate the flushing step.

Hydraulic fluid is supplied to the system from source 21 which may conveniently be the 100° F. constant temperature oil bath in which part of the instrument resides. The bath provides and maintains the proper liquid vapor reference temperature. Hydraulic fluid from source 21 enters the system via lines 22 and 23. Hydraulic fluid pressure of 40–50 p.s.i.g. is developed by hydraulic pump 24 and the pressure is regulated and measured by gauge 25 and pressure relief valve 26. Constant pressures is maintained by having excess hydraulic fluid flow through bypass line 27. Initially, three-way hydraulic solenoid valve 28 is set to permit the flow of fluid into hydraulic cylinder 31 via lines 23, 29 and 30 to provide full hydraulic pressure upon the top of double action piston 32. In addition, three-way solenoid valve 33 is set so that any hydraulic fluid flowing past double-action piston 32 may exit from cylinder 31 via lines 34 and 35 bypass line 27.

After flushing sample line 16 and heat exchanger 17, power is supplied to three-way hydraulic solenoid valves 28 and 33 causing hydraulic fluid to flow from line 23 into cylinder 31 via lines 36 and 34. Hydraulic fluid in hydraulic cylinder 31 above piston 32 exits from cylinder 31 via lines 30, 37 and 35 into bypass line 27 thus causing an upward movement of double-action piston 32 and a corresponding upward movement of liquid piston 42 and expansion piston 45. Simultaneously, two-way solenoid sample valve 38 and two-way solenoid effluent valve 40 open. Liquid piston 42 is located in liquid chamber 41 formed by liquid cylinder 43 and header 47. Expansion piston 45 is located in expansion chamber 44 formed by expansion cylinder 46 and header 47. As liquid piston 42 commences its upward motion ("fill" stroke), liquid sample is drawn into liquid chamber 41 via sample lines 16 and 39 through liquid port 48. At the same time, the upward motion of expansion piston 45 causes expulsion of previous sample residue present in expansion chamber 44, via expansion outlet 49 and line 50 to drain 51. The time required for the "fill" stroke is about 8 seconds.

When expansion piston 45 contacts header 47, the "fill" stroke is completed and a liquid sample e.g. 10 milliliters, is contained in liquid chamber 41. Power is removed from three-way hydraulic solenoid valves 28 and 33 so that hydraulic fluid from line 23 now flows into hydraulic cylinder 31 above piston 32 via lines 29 and 30. Hydraulic fluid below piston 32 exits from hydraulic cylinder 31 via line 34, valve 33 and lines 35 and 27 thus causing a downward movement of double-action piston 32, of liquid piston 42 and expansion piston 45. As the downward motion or "expansion" stroke commences, sample valve 38 and effluent valve 40 close and the two-way solenoid transfer valve 52 opens. Downward motion of expansion piston 45 during the "expansion" stroke forces the liquid sample contained in liquid chamber 41, into expansion chamber 44 (above piston 45) via liquid port 48 line 39, transfer valve 52, and expansion inlet 53. The "expansion" stroke continues until piston 42 contacts header 47 drawing the sample from liquid chamber 41 into expansion chamber 44. At this point, the liquid sample and associated vapor from the sample occupy a volume five times that of the liquid chamber. The "expansion" stroke requires about 8 seconds for completion.

"Fill" stroke and "expansion" stroke cycles are repeated three times to provide a total of four withdraws of liquid from sample container 10. The first 3 cycles completely flush the instrument, thereby removing all residual traces of previous samples. After the fourth "expansion" stroke, transfer valve 52 closes and pistons 32, 42 and 45 are retained in the down position by the hydraulic pressure above double-action piston 32. This condition is maintained for a time sufficient to permit the vapor-liquid sample in expansion chamber 44 to achieve thermal equilibrium. This requires about 2.5 minutes when a 10 milliliter liquid sample is used. Meanwhile, solenoid flush valve 19 is opened and all liquid remaining in sample container 10, line 16, heat exchanger 17, and line 18 flows to drain 51 through needle valve 20. After the sample in expansion chamber 44 comes to thermal equilibrium, the vapor pressure in expansion chamber 44 is measured. Pressure transducer 56, located so that it senses the vapor pressure in expansion chamber 44, acts to modulate a voltage which has been applied to digital voltmeter 54. The voltage has been set so that the millivolt reading on digital voltmeter 54 is equal to the pressure sensed by pressure transducer 56. The equilibrium vapor pressure reading locks into the digital voltmeter 54, air valve 15 and flush valve 19 close, and the instrument is ready for another sample. The R.V.P. reading remains locked in the digital voltmeter until the instrument is manually unlocked or a new measurement sequence begins. The sequence of operations described above are performed automatically. No operator intervention is required other than coupling and decoupling the sample container to the instrument, pressing the start button, and reading the R.V.P. from digital voltmeter 54. Motor driven cycle timers are used to control the sequence of energizing and de-energizing the various solenoid valves in the instrument. Although the constant temperature bath, motor driven stirrer, temperature switch, and heater are not shown in the drawing, it is understood that at least the liquid cylinder 43, expansion cylinder 46, heat exchanger 17, and the associated tubing and hardware are in the bath to maintain them at 100° F. before, during and after expansion. As stated previously, the hydraulic fluid is conveniently also used as the constant temperature medium.

Prior to taking a set of R.V.P. measurements, the pressure measuring section of the instrument (pressure transducer 56 and digital voltmeter 54) is checked for calibration by opening two-way solenoid calibration valve 55 to allow atmospheric pressure within expansion chamber 44. The digital voltmeter 54 reading (after conversion from R.V.P. units to pressure units) is compared with the atmospheric pressure as determined from a barometer separate from the instrument. Prior to taking the R.V.P. measurements, calibration valve 55 is closed to isolate expansion chamber 44 from the atmosphere.

From the foregoing disclosure, it can be appreciated that the present invention provides a novel and useful apparatus and method for automatically determining the R.V.P. of a fluid. The particular embodiment described provides a low cost means for taking accurate, reproducible and rapid measurements of the R.V.P. Although the invention has been described in terms of a specific apparatus which has been described in detail, it will be understood that this description illustrates only one embodiment of the invention. The invention is not limited to that one embodiment. Another suitable embodiment comprises a pair of positive displacement pumps, one having a substantially greater displacement than the other. The intake port of the pump having the larger displacement is connected to the exhaust port of the other pump by means of a conduit. By operating the pumps so that the intake strokes of one and the exhaust strokes of the other are in phase, the pumps are easily adapted to vapor pressure measurement. To do this, a pressure measuring device must be provided for determining the pressure within the pump having the larger displacement. Further, a means for providing a reference temperature within the pump chambers is required. It is also necessary that the pumping strokes be interruptable to permit the contents of the pump having the larger displacement to be brought to equilibrium at maximum intake volume prior to measuring the pressure therein.

Other embodiments and techniques previously described and modifications thereof employing the same principles will become apparent from the disclosure to those skilled in the art. Accordingly, modifications in the means of this invention are contemplated without departing from the spirit of the described invention.

Having thus described the invention, what is claimed is:

1. An apparatus for determining the vapor pressure of normally liquid hydrocarbon fuels comprising:
   (a) a first chamber adapted to receive and discharge a liquid sample of the hydrocarbon fuel;
   (b) a second chamber having interruptable fluid communication with the first chamber and having substantially greater volume than the volume of the first chamber;
   (c) means for removing substantially all liquid and vapor hydrocarbon fuel from the second chamber;
   (d) means for transferring the sample from the first chamber to the second chamber;
   (e) means for interrupting the fluid communication between the first chamber and the second chamber;
   (f) means for bringing the contents of the second chamber to a constant reference temperature; and
   (g) means for measuring pressure in the second chamber.

2. The apparatus of claim 1 wherein the volume of the second chamber is five times the volume of the sample transferred from the first chamber.

3. The apparatus of claim 1 wherein the first chamber has a port adapted for receiving and discharging liquid sample, the second chamber has an inlet in fluid communication with the first chamber port, and an outlet for discharging of sample, and the volume of the second chamber is five times the volume of the sample transferred from the first chamber.

4. The apparatus of claim 3 wherein the means for transferring liquid sample from the first chamber to the second chamber comprises:
   (a) a first piston mounted in the first chamber and adapted for reciprocating motion therein, to draw liquid sample through the port in the first chamber by movement of the first piston in one direction within the first chamber, and to discharge liquid sample from the first chamber through the port by movement of the first piston in the reverse direction within the first chamber; and
   (b) a second piston mounted in the second chamber and adapted for reciprocating motion therein, to draw liquid sample through the inlet into the second chamber by movement of the second piston in one direction within the second chamber, and to discharge sample from the second chamber through the outlet by movement of the second piston in the reverse direction within the second chamber, and the movements of the first piston and second piston phased to transfer essentially all of the liquid initially in the first chamber into the maximum volume of the second chamber.

5. The apparatus of claim 4 wherein the second piston is mounted in the second chamber to exclude all vapor and liquid from said second chamber when said first chamber contains a maximum amount of liquid sample, and the means for interrupting fluid communication is at least one valve positioned between the first chamber port and the second chamber inlet to permit flow only in the direction from the first chamber to the second chamber.

6. The apparatus of claim 4 wherein the first piston and the second piston are connected by a common shaft.

7. An apparatus for measuring the Reid Vapor Pressure of a normally liquid hydrocarbon fuel for internal combustion engines comprising:
   (a) a header;
   (b) a first container mounted on and sealed to one side of said header to form a liquid and vapor-tight liquid chamber, said liquid chamber having a port through which said hydrocarbon fuel may be drawn into and expelled from said liquid chamber;
   (c) a second container mounted on and sealed to the reverse side of said header to form a liquid and vapor-tight expansion chamber, said expansion chamber having an inlet through which said hydrocarbon fuel may be drawn into said expansion chamber and an outlet through which the hydrocarbon fuel may be expelled from said second chamber;
   (d) a first piston mounted for reciprocating motion within said liquid chamber said piston having a seal to prevent the passage of said hydrocarbon fuel between the first piston and the liquid chamber walls and said first piston further having a longitudinal shaft extending through said header;
   (e) a second piston mounted for reciprocating motion within said expansion chamber said second piston having a seal to prevent passage of the hydrocarbon fuel and its vapor between said second piston and the expansion chamber walls, said second piston further having a longitudinal shaft rigidly affixed to the portion of said first piston shaft extending through said header;
   (f) a valved transfer line for connecting the liquid chamber port to said expansion chamber inlet, said valved transfer line permitting the flow of hydrocarbon fuel only in the direction from said liquid chamber to said expansion chamber;
   (g) a sample container fitting for receiving and sealing a demountable sample container;
   (h) conduit and valve means extending from said sample container fitting to said liquid chamber port to permit the flow of hydrocarbon fuel contained within said sample container into said liquid chamber port;
   (i) a transducer located to respond to the pressure of vapor contained within said expansion chamber;
   (j) a volt meter electrically connected to said pressure transducer to record voltage fluctuations caused by the action of vapor pressure acting upon said transducer;
   (k) a reference temperature bath into which said liquid chamber, expansion chamber, valved transfer line, and conduit and valve means are immersed in order to keep said liquid chamber, expansion chamber, valved transfer line, and conduit and valve means, and the hydrocarbon fuel contained within said liquid chamber, expansion chamber, valved transfer line, and conduit and valve means at a fixed determinable temperature; and
   (l) means for urging said hydrocarbon fuel from said sample container through said conduit and valve means into said liquid chamber.

8. The apparatus of claim 7 wherein said conduit and valve means include a heat exchanger to permit the hydrocarbon fuel to approach said reference temperature at a rapid rate prior to entering said liquid chamber and wherein a valved bypass line extends from said conduit and valve means to a drain in order that the hydrocarbon fuel may be diverted from the sample container to the drain rather than pass to the liquid chamber.

References Cited

UNITED STATES PATENTS

| 2,540,377 | 2/1951 | Pachaly | 73—64.2 |
| 2,671,341 | 3/1954 | Jacobs | 73—64.2 |
| 3,037,375 | 6/1962 | Jacobs et al. | 73—64.2 |
| 3,120,752 | 2/1964 | Hutchings et al. | 73—64.2 |

LOUIS R. PRINCE, Primary Examiner

HARRY C. POST III, Assistant Examiner

UNITED STATES PATENT OFFICE
CERTIFICATE OF CORRECTION

Patent No. 3,499,317     Dated  March 10, 1970

Inventor(s) Roy E. Hook

It is certified that error appears in the above-identified patent and that said Letters Patent are hereby corrected as shown below:

Column 4, line 20 delete "is commonly provided with a piston to expell the" and substitute therefor -- (hereinafter called the expansion chamber) are --.

SIGNED AND SEALED
MAR 2 1971

(SEAL)
Attest:

Edward M. Fletcher, Jr.
Attesting Officer

WILLIAM E. SCHUYLER, JR.
Commissioner of Patents